United States Patent
Waddleton et al.

(10) Patent No.: US 11,280,342 B2
(45) Date of Patent: Mar. 22, 2022

(54) ROTODYNAMIC PUMP AND METHOD

(71) Applicant: PRATT & WHITNEY CANADA CORP., Longueuil (CA)

(72) Inventors: David Waddleton, Candiac (CA);
Benjamin Renaud, Montreal (CA);
Sebastien Bergeron, Chambly (CA);
Etienne Plamondon, Candiac (CA);
Jean-Gabriel Gauvreau, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 371 days.

(21) Appl. No.: 16/376,320

(22) Filed: Apr. 5, 2019

(65) Prior Publication Data
US 2020/0318644 A1 Oct. 8, 2020

(51) Int. Cl.
*F04D 27/00* (2006.01)
*F02C 7/22* (2006.01)

(52) U.S. Cl.
CPC .............. *F04D 27/002* (2013.01); *F02C 7/22* (2013.01)

(58) Field of Classification Search
CPC .......... F04D 27/002; F04D 5/007; F04D 5/02; F04D 15/005; F04D 27/00; F04D 15/00; F02C 7/22; F02C 9/30
See application file for complete search history.

(56) References Cited

U.S. PATENT DOCUMENTS

| | | | |
|---|---|---|---|
| 3,656,861 A | | 4/1972 | Zagar |
| 3,667,722 A | * | 6/1972 | Katz ....................... F16K 31/10 |
| | | | 251/30.04 |
| 4,449,506 A | * | 5/1984 | Drutchas .............. F02D 41/266 |
| | | | 123/390 |
| 4,948,344 A | * | 8/1990 | Cygnor ................... F04D 5/002 |
| | | | 415/55.1 |
| 6,022,197 A | | 2/2000 | Cygnor et al. |
| 6,059,537 A | | 5/2000 | Cygnor |
| 6,527,506 B2 | | 3/2003 | Pickelman et al. |
| 7,559,315 B1 | | 7/2009 | Yu et al. |
| 8,529,221 B2 | * | 9/2013 | Futa, Jr ..................... F02C 9/36 |
| | | | 417/310 |
| 9,869,326 B2 | | 1/2018 | Stark et al. |
| 10,041,497 B2 | | 8/2018 | Nyzen |
| 2004/0079081 A1 | | 4/2004 | Jevons |

(Continued)

FOREIGN PATENT DOCUMENTS

DE 943803 C * 6/1956 ........... F04D 15/005
DE 943803 C 6/1956

(Continued)

*Primary Examiner* — Juan G Flores
*Assistant Examiner* — Joshua R Beebe
(74) *Attorney, Agent, or Firm* — Norton Rose Fulbright Canada LLP

(57) ABSTRACT

A method of controlling a delivery pressure of an aircraft engine fuel system includes operating a rotodynamic fuel pump hydraulically connected to the fuel system to pump a fluid from an inlet of the rotodynamic pump and out of an outlet of the rotodynamic pump for delivery to the fuel system. The method further includes varying an angular relationship between the inlet and the outlet of the pump to control the delivery pressure. An aircraft engine fuel system and a rotodynamic pump are also described.

19 Claims, 4 Drawing Sheets

(56) References Cited

U.S. PATENT DOCUMENTS

2013/0320148 A1    12/2013  Lewis
2016/0186670 A1*  6/2016  Oba ..................... F04D 13/028
                                                                        417/15

FOREIGN PATENT DOCUMENTS

| EP | 636791 A1 | | 7/1994 | |
|----|-----------|---|--------|---|
| EP | 0636791 A1 | * | 2/1995 | ........... F04D 23/008 |
| EP | 636791 A1 | | 2/1995 | |

* cited by examiner

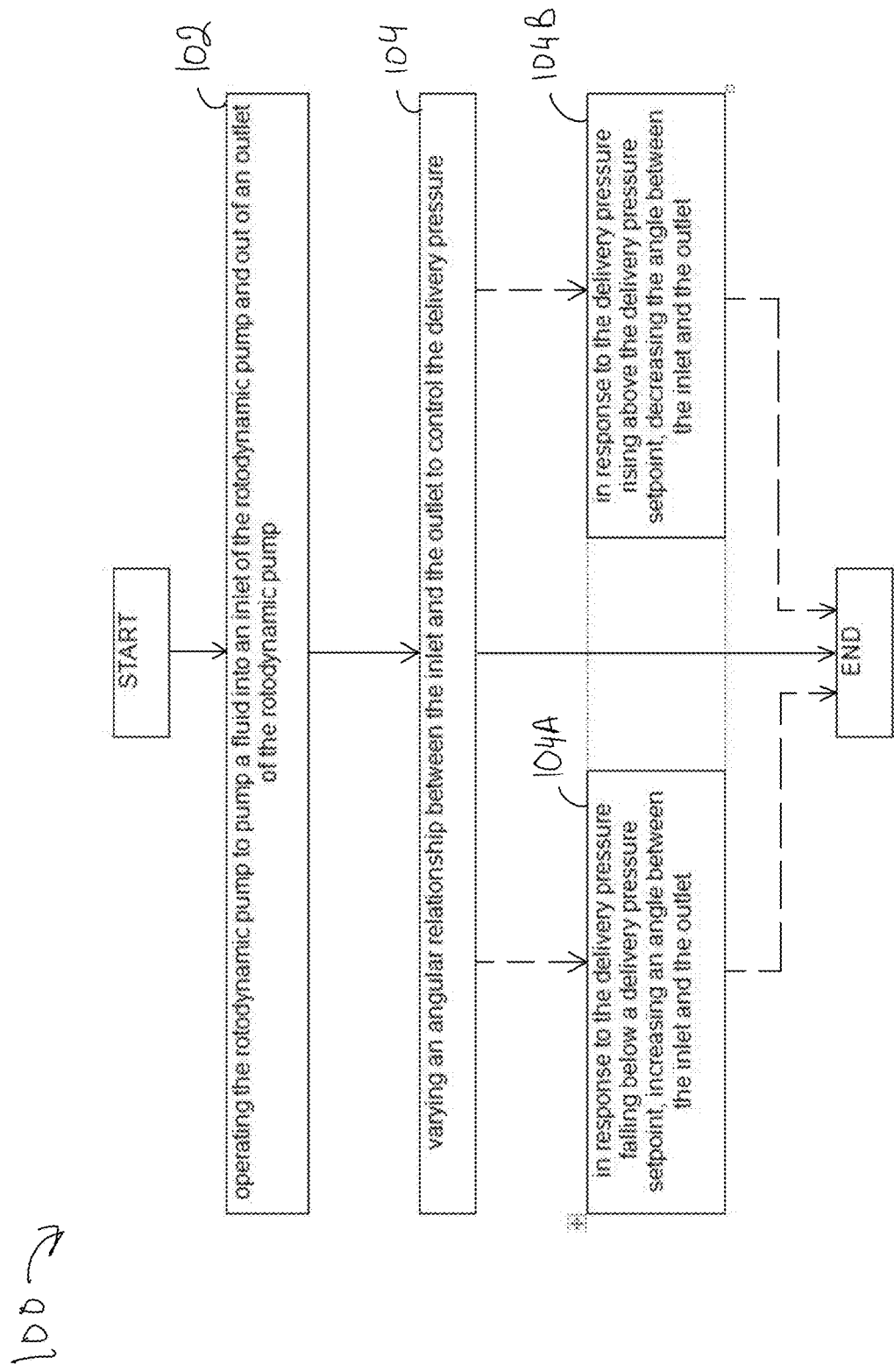

ROTODYNAMIC PUMP AND METHOD

TECHNICAL FIELD

The application relates to rotodynamic pumps for aircraft engine fuel systems.

BACKGROUND

Prior art fuel pumps typically use recirculation arrangements with a pressure regulator that selectively recirculate fuel from a pump's outlet to the pump's inlet and thereby regulate the fuel delivery pressure provided by the pump. In some cases, recirculation of fuel to a pump's inlet may negatively affect the pump's operational performance under depressed inlet conditions. Thus, improvements to prior art fuel pump technology could be made.

SUMMARY

In one aspect, the present technology provides a method of controlling a delivery pressure of an aircraft engine fuel system, comprising: operating a rotodynamic fuel pump hydraulically connected to the fuel system to pump a fluid from an inlet of the rotodynamic pump and out of an outlet of the rotodynamic pump for delivery to the fuel system, and varying an angular relationship between the inlet and the outlet of the pump to control the delivery pressure.

In some embodiments, the varying the angular relationship includes, in response to the delivery pressure falling below a delivery pressure setpoint, increasing an angle between the inlet and the outlet.

In some embodiments, the varying the angular relationship includes in response to the delivery pressure rising above the delivery pressure setpoint, decreasing the angle between the inlet and the outlet.

In some embodiments, the increasing the angle includes pivoting a first part of a housing of the rotodynamic pump relative to a second part of the housing in a first direction, the first part defining one of the inlet and the outlet therein, the second part defining another one of the inlet and the outlet therein, and the decreasing the angle includes pivoting the first part relative to the second part in a second direction opposite to the first direction.

In some embodiments, the pivoting the first part relative to the second part is about a rotation axis of an impeller of the rotodynamic pump.

In some embodiments, the first part and the second part define an impeller cavity therebetween and the impeller is disposed at least in part in the impeller cavity.

In some embodiments, the pivoting the first part relative to the second part includes actuating, by the fluid downstream of the impeller, a passive pressure regulating mechanism.

In some embodiments, the pivoting the first part relative to the second part includes receiving a signal at a controller, the signal being indicative of the delivery pressure, and operating, by the controller, an actuator of an active pressure regulating mechanism to pivot the first part relative to the second part in response to changes in the delivery pressure to regulate the delivery pressure toward the delivery pressure setpoint.

In another aspect, the present technology provides an aircraft engine fuel system comprising a rotodynamic pump having an inlet and an outlet connected to the fuel system, a pressure regulating assembly operatively associated with at least one of the inlet and the outlet, and a controller configured to vary an angle between the inlet and the outlet to regulate a delivery pressure at the outlet.

In some embodiments, the pressure regulating mechanism is configured to vary the angle in response to fluctuations in the delivery pressure.

In some embodiments, the fuel system further comprises a fluid conduit hydraulically connecting the outlet to an actuator of the pressure regulating mechanism, the actuator being operatively operatively connected to the at least one of the inlet and the outlet of the pump to vary the angle.

In some embodiments, the actuator is operatively operatively connected to the at least one of the inlet and the outlet via a mechanical linkage.

In some embodiments, the actuator is a linear actuator biased to a neutral position by a biasing member such that the linear actuator is in the neutral position when the delivery pressure is below a delivery pressure setpoint.

In some embodiments, the fuel system comprises a housing having a first part and a second part movable relative to the first part, the first and second parts define an in impeller cavity therebetween, an impeller being disposed at least in part in the impeller cavity, the first part defining one of the inlet and the outlet therein, the second part defining another one of the inlet and the outlet therein.

In yet another aspect, the present technology provides a rotodynamic pump, comprising a housing defining an inlet and an outlet therein, the first and second parts defining an impeller cavity therebetween, an impeller disposed at least in part in the impeller cavity, and a pressure regulating mechanism adapted to vary an angular relationship between the inlet and the outlet to control a delivery pressure at the outlet.

In some embodiments, the housing includes a first part and a second part, the first part being movable relative to the second part, the first part defines one of an inlet and an outlet therein, the second part defines another one of the inlet and the outlet therein, and the pressure regulating mechanism is adapted to vary the angular relationship by moving the first part relative to the second part.

In some embodiments, the pressure regulating mechanism is adapted to vary the angular relationship by pivoting the first part relative to the second part.

In some embodiments, the first part is pivotable relative to the second part about a rotation axis of the impeller.

In some embodiments, the pressure regulating mechanism is a passive pressure regulating mechanism operable by the fluid being at the delivery pressure.

In some embodiments, the pressure regulating mechanism is an active pressure regulating mechanism. In some such embodiments, the pressure regulating mechanism comprises an actuator operatively connected to the first part to pivot the first part relative to the second part, and a controller operable to operate the actuator in response to a signal indicative of the delivery pressure.

DESCRIPTION OF THE DRAWINGS

Reference is now made to the accompanying figures in which:

FIG. 4 is a logic flow diagram showing a method of controlling a delivery pressure of the rotodynamic pump of FIG. 2.

DETAILED DESCRIPTION

The present technology is illustrated with respect to a rotodynamic fuel pump that is part of a fuel system for an aeronautical internal combustion engine 10. In the embodiment shown in FIG. 1, the aeronautical internal combustion engine 10 is a turboshaft engine 10. In other embodiments, the aeronautical internal combustion engine 10 is a turbofan engine. In yet other embodiments, the aeronautical internal combustion engine 10 is a rotary engine. It is contemplated that the present technology can be applied to other types of engines as well. It is contemplated that the present technology can be used in other applications as well.

It is also contemplated that the present technology could be implemented into a different type of pump than the one shown in the figures of the present document. For example, it is contemplated that the pump could be a pump in which fluid pressure rises as fluid moves through the pump from an inlet of the pump to an outlet of the pump. For example, it is contemplated that a positive displacement gear type pump could be used in at least some embodiments and/or some applications. As another example, it is contemplated that a multi-stage type pump, or multiple pumps in series, could be used in at least some embodiments and/or some applications.

For the purposes of the present description, the term "fuel conduit" is used to describe an arrangement of one or more elements, such as one or more hoses, pipes, tubing, connectors and/or other elements, that together form a flow path or flow paths for a liquid to flow from point A to point B. For example, a given fuel conduit may be defined by any number and combination of hoses hydraulically interconnected in parallel and/or series, by or with one or more fuel filters, switches, pumps, and the like, depending on the particular function(s) of the given fuel conduit and/or the particular embodiment of the engine that the given fuel conduit is used with, for example.

Figure 1:
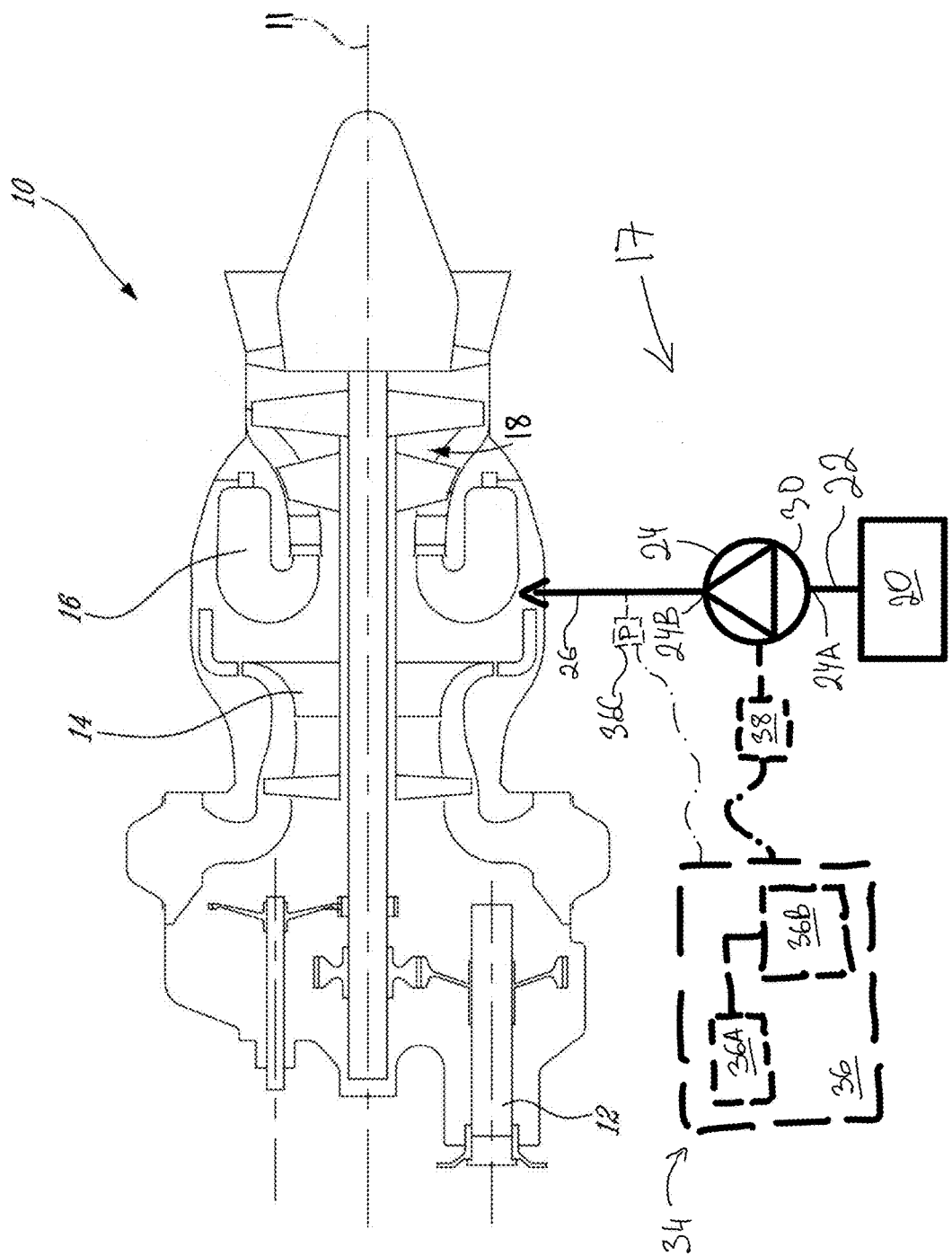
FIG. 1 is a schematic showing an aeronautical turboshaft engine and a part of a fuel system thereof.

Referring to FIG. 1, in the present non-limiting embodiment, the engine 10 comprises in serial flow communication a shaft 12 for driving a rotor, such as a rotor of a helicopter for example, a compressor section 14 for pressurizing ambient air, a combustion chamber 16 in which the compressed air is mixed with fuel and ignited for generating an annular stream of hot combustion gases, a liquid fuel system 17 that delivers the fuel to the combustion chamber 16, and a turbine section 18 for extracting energy from the combustion gases. Components of the engine 10 are rotatable about a longitudinal center axis 11 of the engine 10.

Figure 2:
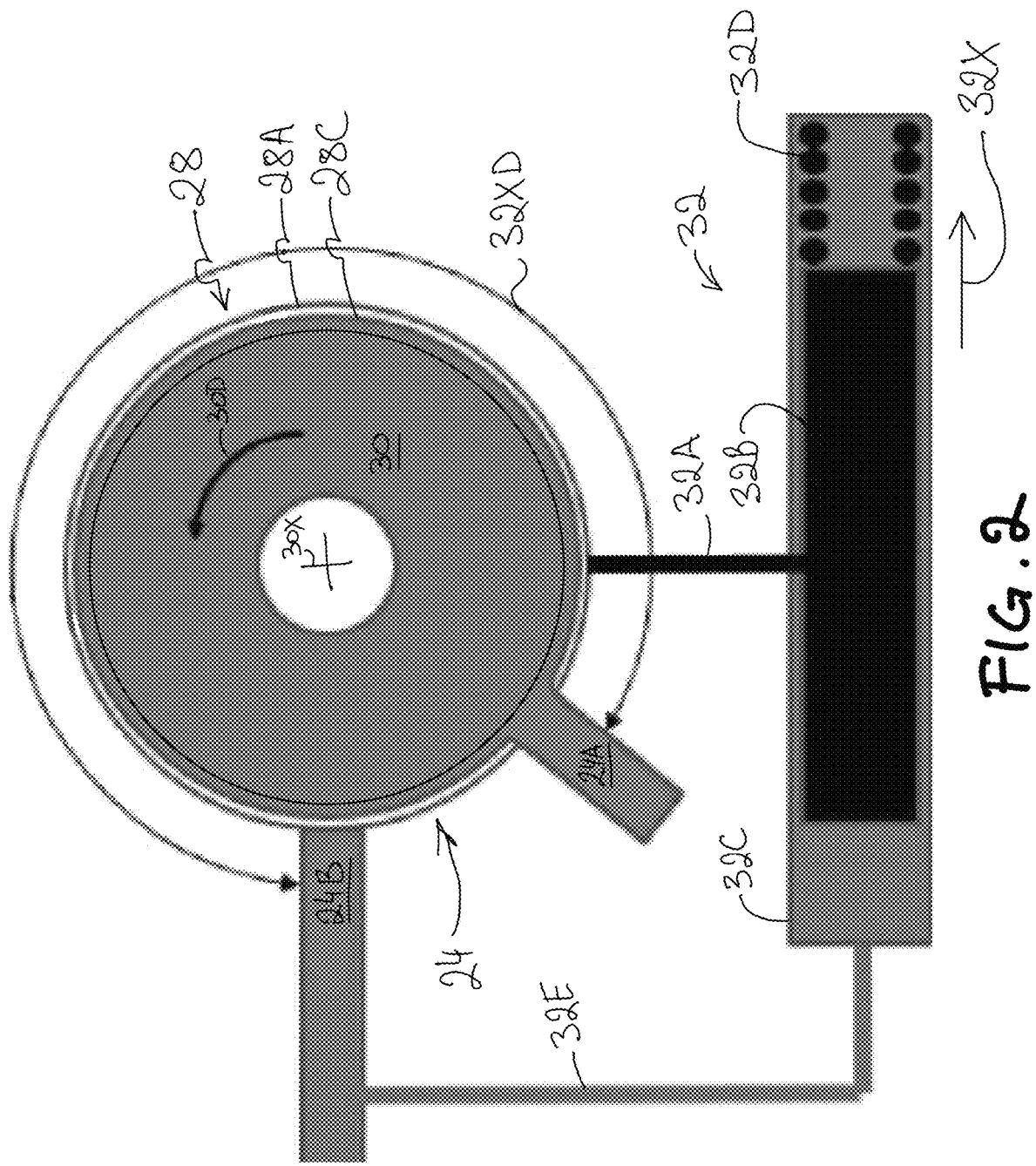
FIG. 2 is a schematic plan view showing a rotodynamic pump and a passive pressure regulating mechanism of the fuel system of FIG. 2.

Referring to FIGS. 1 and 2, fuel is supplied to the combustion chamber 16 via the fuel system 17 from a fuel source 20 such as a fuel tank of the aircraft with which the engine 10 is used. To this end, in the present embodiment, the fuel system 17 includes a fuel supply conduit 22 that is hydraulically connectable to the fuel source 20. A regenerative rotodynamic pump 24 is hydraulically connected to the fuel supply conduit 22 and to a fuel supply conduit 26.

The fuel supply conduit 26 hydraulically connects the pump 24 to the combustion chamber 16 via one or more fuel injectors, or fuel nozzles, that inject pressurized fuel into the combustion chamber 16. It is contemplated that the fuel system 17 could have a different arrangement of fuel conduits, so long as the functionality described in this document is achieved.

It is contemplated that in some embodiments, the fuel system 17 may include more than one fuel pump, with the pump 24 being one of the pumps. It is contemplated that one or more of the pumps could be upstream of the pump 24 and/or that one or more of the pumps could be downstream of the pump 24 and/or that one or more of the pumps could be hydraulically in parallel with the pump 24, etc, depending on each particular embodiment of the engine 10 and each particular type of aircraft with which the engine 10 is used.

The fuel system 17 may comprise additional elements, such as heat exchanger(s), fuel filter(s), additional pump(s), flow divider(s) and the like (not shown), that may be necessary for operation of the fuel system 17 depending on each particular application of the fuel system 17 and each particular embodiment of the engine 10 and each particular embodiment of the aircraft with which the engine 10 is used. Such additional fuel system elements may be conventional. Therefore, for clarity, such additional fuel system elements are not shown and are not described in detail.

Referring to FIG. 2, the pump 24 includes a housing 28. The housing 28 defines a main pump inlet 24A (or simply inlet 24A, etc) and a pump outlet 24B (or simply outlet 24B, etc), and an impeller cavity 28C therein. A pump impeller 30 (or simply impeller 30) is disposed at least in part in the impeller cavity 28C. The impeller 30 is rotatable about a rotation axis 30X to pump fuel from the inlet 24A to, and out of, the outlet 24B of the pump 24. The impeller 30 is shown schematically but may have a plurality of vanes, etc.

The fuel supply conduit 22 connects to the inlet 24A to allow the pump 24 to draw fuel from the fuel source 20. The fuel supply conduit 26 connects to the outlet 24B to allow the pump 24 to pump the fuel to the fuel injectors/nozzles for supply to the combustion chamber 16. To generate this flow, the impeller 30 is rotatable by a power source, such as a shaft of the engine 10 (with or without an appropriate transmission), in the direction 30D about the rotation axis 30X. The impeller 30 may be operated by a dedicated motor or actuator as well. In other applications of the pump 24, the power source may be different.

In the present embodiment, the pump 24 is disposed inside a cowl of the engine 10. It is contemplated that in some embodiments, the pump 24 could be integrated into the engine 10, such as by at least part of the housing 28, and/or by at least part of one or both of the inlet 24A and the outlet 24B, being machined into one or more blocks of the engine 10 in a way that would provide for the functionality described in this document.

As described in more detail below, the inlet 24A is movable/adjustable, in the present embodiment about the rotation axis 30X of the impeller 30, to adjust a delivery pressure of the liquid fuel at the outlet 24B of the pump 24. In some such embodiments, the fuel supply conduit 22 that connects to the inlet 24A is defined at least in part by a flexible connector, such as a flexible hose or other suitable flexible element(s), via which the fuel supply conduit 22 connects to the inlet 24A to allow for the movement of the inlet 24A as described herein. It is contemplated that any other connections/connectors/construction between/of the fuel supply conduit 22 and/or the inlet 24A could be used, so long as the functionalities of the various embodiments described in this document are provided. This may include telescopic pipes, a manifold, an annular chamber, etc.

Also as described in more detail below, in some embodiments the outlet 24B is movable in addition to the inlet 24A being movable. In some such embodiments, the fuel supply conduit 26 that connects to the outlet 24B is defined at least in part by a flexible connector, such as a connector similar to the flexible connector of the fuel supply conduit 22. It is contemplated that a different construction, other than via flexible connectors, could be used to allow for the movement of the inlet 24A and/or the outlet 24B, as the movement is described in this document. Again, this may include telescopic pipes, a manifold, an annular chamber, etc.

Figure 3:
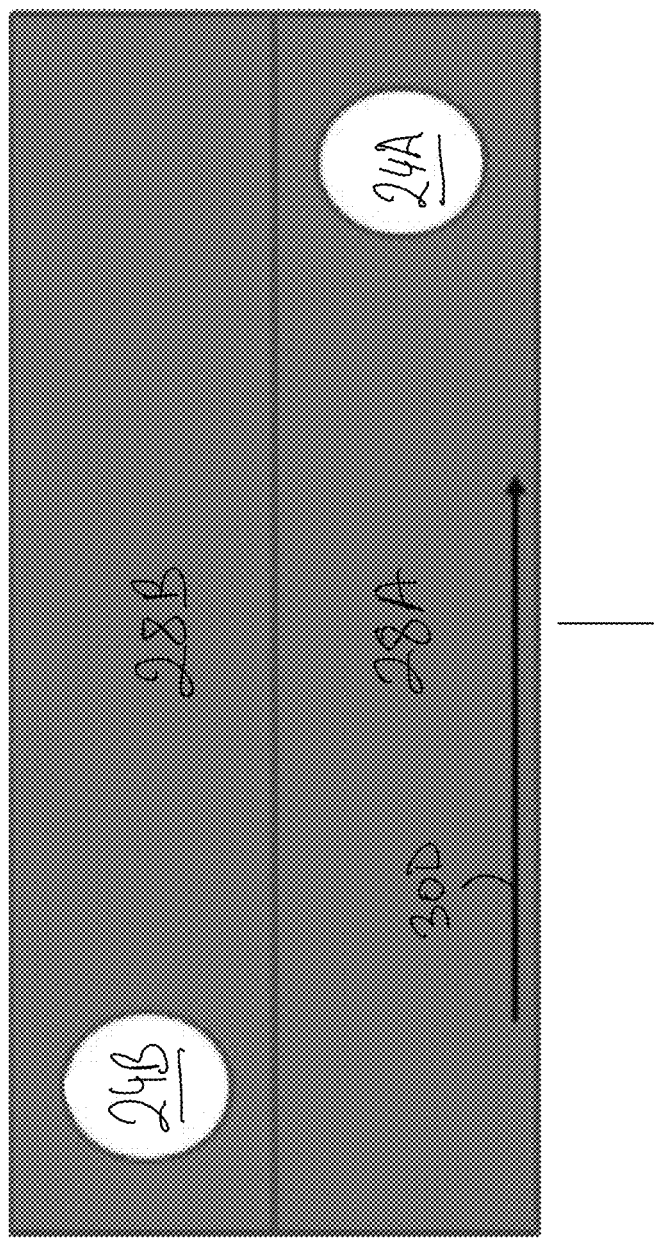
FIG. 3 is schematic side view of a housing of the rotodynamic pump of FIG. 2.

Now referring to FIGS. 2 and 3, in the present embodiment, the housing 28 of the pump 24 includes two portions: a movable housing portion 28A and a fixed housing portion 28B. The movable housing portion 28A and the fixed housing portion 28B define the impeller cavity 28C therebetween.

The movable housing portion 28A is attached to the fixed housing portion 28B via a dynamic seal that seals the impeller cavity 28C to prevent leaks from between the housing portions 28A and 28B. The dynamic seal also allows the movable housing portion 28A to pivot relative to the fixed housing portion 28B and to thereby alter a hydraulic distance within the impeller cavity 28C between the inlet 24A and the outlet 24B. It is contemplated that the dynamic seal could be a conventional dynamic seal and may include elements such as o-rings.

In the present embodiment, the movable housing portion 28A is pivotable relative to the fixed housing portion 28B about the rotation axis 30X of the impeller 30, and therefore this pivoting adjusts the hydraulic distance by changing an angular relationship, and more particularly an angle 32XD between the inlet 24A and the outlet 24B. As shown, in the present embodiment, the angle 32XD is defined about the rotation axis 30X of the impeller 30. For example, the angle 32XD may be a projection of a central axis of the inlet 24A and outlet 24B on a plane to which the rotation axis 30X is normal. As another example, the angle 32XD may be a projection of segments extending from a center of the inlet 24A to a center of the impeller 30, and extending from a center of the outlet 24B to the center of the impeller 30, as projected onto the plane to which the rotation axis 30X is normal.

Since the impeller 30 adds kinetic energy to the fuel, and hence increases pressure of the fuel, as fuel flows from the inlet 24A toward the outlet 24B, increasing the angle 32XD increases the amount of kinetic energy/pressure added by the pump 24 to the fuel. Conversely, decreasing the angle 32XD decreases the amount of kinetic energy/pressure added by the pump 24. In the present embodiment, this relationship between the angle 32XD and the kinetic energy/pressure added by the pump 24 to the fuel is used to control/regulate the delivery pressure of the fuel at the outlet 24B of the pump 24. More particularly, the angle 32XD is decreased to decrease delivery pressure of the pump 24, and the angle 32XD is increased to increase the delivery pressure.

It is contemplated that in other embodiments, the adjustability of the angle 32XD could be provided by constructing the housing 28 to make the outlet 24B movable relative to the inlet 24A with the inlet 24A being either fixed or also movable. Stated different, there is relative movement between the inlet 24A and the outlet 24B, achieved by movement of the inlet 24A and/or outlet 24B. For example, in some such embodiments, the movable housing portion 28A is a fixed housing portion, and the fixed housing portion 28B is a movable housing portion. It is contemplated that any different construction of the housing 28 could be used so long as the different construction is suitable for each given application of the pump 24 and provides for the functionalities described in this document.

Referring to FIG. 2, in the present embodiment, the delivery pressure of the pump 24 is regulated by a passive pressure regulating mechanism 32. The mechanism 32 is said to be passive, in that it may not need to be operated by an electronic controller and/or electric power. The passive pressure regulating mechanism 32 includes a mechanical link 32A which is at one end operatively connected to the movable housing portion 28A to pivot the movable housing portion 28A about the rotation axis 30X as described above. In the present embodiment, the mechanical link 32A at another end is operatively connected to a spool 32B. As described in detail below, the mechanical link 32A converts linear movement of the spool 32B to pivoting movement of the movable housing portion 28A about the rotation axis 30X. It is contemplated that any mechanical link 32A suitable for each particular embodiment and application of the pump 24 could be used, for instance as embodied by one or more joints (e.g., revolute joints).

In the present embodiment, the spool 32B is slidably received in a sleeve 32C and is biased to a neutral position by a biasing member 32D. In the present embodiment, the biasing member 32D is a coil spring, but any other suitable biasing member could likewise be used. For example, a leaf spring, a compressed gas (seal gas cavity), could be used to provide a biasing force.

A fluid conduit 32E hydraulically connects the outlet 24B of the pump 24 to the sleeve 32C, and thereby applies a force that results from and is proportional to the delivery pressure of the pump 24 to one side of the spool 32B, against a biasing force of the biasing member 32D. A biasing characteristic of the biasing member 32D, which in the present embodiment is a spring rate, is selected such that the biasing force of the biasing member 32D is in equilibrium with the force applied by the fuel to the spool 32B against the biasing force when the delivery pressure is at a desired delivery pressure setpoint of the pump 24.

During operation of the fuel system 17, if and when the delivery pressure rises above the delivery pressure setpoint, the force applied by fuel to the spool 32B via the fuel conduit 32E likewise rises and moves the spool 32B against the biasing force of the biasing member 32D, in the present embodiment in direction 32X. In the present embodiment, movement of the spool 32B in the direction 32X pivots the movable housing portion 28A via the mechanical link 32A to decrease the hydraulic distance, and the angle 32XD, between the inlet 24A and the outlet 24B of the pump 24, and thereby reduces the delivery pressure toward the delivery pressure setpoint.

Conversely, if and when the delivery pressure drops to below the delivery pressure setpoint, the biasing member 32D moves the spool 32B in a direction opposite to direction 32X and thereby pivots the movable housing portion 28A to increase the hydraulic distance, and the angle 32XD, between the inlet 24A and the outlet 24B of the pump 24. This causes the delivery pressure to rise toward the delivery pressure setpoint.

By executing the adjustments of the hydraulic distance and/or the angle 32XD as described above in response to fluctuations of the delivery pressure, the passive pressure regulating mechanism 32 regulates the delivery pressure toward the delivery pressure setpoint during operation of the fuel system 17.

In embodiments in which the outlet 24B is movable instead of the inlet 24A, the passive pressure regulating mechanism 32 may be operatively connected to the outlet 24B instead of to the inlet 24A as described above, and may thus selectively move the outlet 24B to regulate the delivery pressure of the pump 24. It is contemplated that a different passive pressure regulating mechanism 32 could be used to provide for the regulation of the delivery pressure toward the delivery pressure setpoint. For example, it is also contemplated that instead of the spool 32B/sleeve 32C/spring 32D arrangement, the movable housing portion 28A may be spring loaded to be biased to the neutral position with a torsional spring, a dead-headed cavity may be defined in the movable housing portion 28A, and the delivery pressure may be ported to the dead-headed cavity to apply a hydraulic force on the movable housing portion 28A against the torsional spring. The hydraulic force may then move the movable housing portion 28A similar to the way described above with respect to the spool 32B/sleeve 32C/spring 32D arrangement to regulate the delivery pressure of the pump 24.

Referring back to FIG. 1, in some embodiments, an active pressure regulating mechanism 34 is used instead of the passive pressure regulating mechanism 32. As shown, in some such embodiments, the active pressure regulating mechanism 34 includes a controller 36 communicatively coupled to an active actuator 38, with the actuator 38 being operatively connected to the inlet 24A and/or the outlet 24B to selectively move the inlet 24A and/or the outlet 24B to adjust the hydraulic distance/the angle 32XD therebetween as described above.

For example, in embodiments with the housing 28 as described above, the actuator 38 may be operatively connected to the movable housing portion 28A via a mechanical link to pivot the movable housing portion 28A about the rotation axis 30X and to thereby adjust the hydraulic distance/the angle 32XD between the inlet 24A and the outlet 24B. It is contemplated that the actuator 38 could be operatively connected to the inlet 24A and/or the outlet 24B via any suitable gearing and/or link(s).

In some embodiments, the actuator 38 is an electro-hydraulic servo valve. It is contemplated that the actuator 38 could be any other suitable type of active actuator, such as a hydraulic actuator operable via at least one corresponding electronically operated hydraulic valve. It is also contemplated that any suitable hydro-mechanical actuator could be used.

Still referring to FIG. 1, in the present embodiment, the controller 36 includes a processor 36A and a non-transient memory 36B communicatively coupled to the processor 36A. The non-transient memory 36B has processor-executable instructions thereon which, when executed by the processor 36A, cause the controller 36 to execute a proportional-integral-derivative (PID) control algorithm to operate the actuator(s) 38 in response to a signal indicative of the delivery pressure of the pump 24.

In some embodiments, the signal is provided by a pressure sensor 36C that is operatively coupled to the fuel supply conduit 26 and communicatively coupled to the controller 36. It is contemplated that multiple pressure sensors could likewise be used to directly or indirectly provide an indication of the delivery pressure to the controller 36. In some embodiments, the fuel system 17 omits one or more of, or all of the pressure sensors 36C and is instead ported to provide hydraulic pressure feedback with respect to the delivery pressure.

In the present embodiment, the controller 36 regulates the delivery pressure in response to fluctuations therein, toward, and in some embodiments also to, the delivery pressure setpoint by selectively operating the actuator 38 and thereby pivoting/moving the movable housing portion 28A, and therefore the inlet 24A, relative to the fixed housing portion 28B to adjust the hydraulic distance and/or the angle 32XD between the inlet 24A and the outlet 24B.

For example, in response to the delivery pressure falling below the delivery pressure setpoint, the controller 36 pivots the movable housing portion 28A, and thereby moves (or adjusts the relative position of) the inlet 24A, to increase the hydraulic distance/the angle 32XD between the inlet 24A and the outlet 24B as described above with respect to the passive pressure regulating mechanism 32 embodiment. The controller 36 thereby increases the delivery pressure toward the delivery pressure setpoint.

As another example, in response to the delivery pressure rising above the delivery pressure setpoint, the controller 36 pivots the movable housing portion 28A, and thereby moves (or adjusts the relative position of) the inlet 24A, to decrease the hydraulic distance/the angle 32XD between the inlet 24A and the outlet 24B as described above with respect to the passive pressure regulating mechanism 32 embodiment. The controller 36 thereby decreases the delivery pressure toward the delivery pressure setpoint.

By executing such movements/adjustments in response to fluctuations in the delivery pressure, the controller 36 regulates the delivery pressure toward the delivery pressure setpoint. In the present embodiment, the memory 36B of the controller 36 stores a proportional-integral-derivative (PID) control algorithm therein, which is executed by the processor 36A to perform necessary sequences and magnitudes of adjustments of the hydraulic distance/the angle 32XD as described above, to provide for the regulation of the delivery pressure. Thus, using the PID algorithm, the controller 36 executes the movements/displacements described above in corresponding sequences to counteract changes of the delivery pressure to maintain the delivery pressure at or near the delivery pressure setpoint.

In embodiments implementing a PID control algorithm, the delivery pressure is an input to the PID control algorithm. It is contemplated that a different type of control algorithm could be used. It is also contemplated that a different type of controller could be used. For example, it is contemplated that a hydraulically and/or pneumatically operated controller could be used. It is also contemplated that the controller 36 could be part of, or could be, a controller responsible for other subsystems of the engine 10. Likewise, it is contemplated that more than one controller 36 and/or more than one actuator 38 could be used to suit each particular embodiment and application of the pump 24.

Now referring to FIG. 4, and with the above embodiments in mind, the present technology provides a method 100 of method of controlling a delivery pressure of a rotodynamic pump 24. While the method 100 is illustrated with respect to supplying fuel to the combustion chamber 16 of the engine 10, it is contemplated that the method could also have other applications and/or be utilized with fluids other than fuel.

In the present embodiment, the method 100 may start at step 102, at which a pump, such as the pump 24, is operated to pump a fluid, such as but not limited to fuel, into an inlet 24A of the rotodynamic pump 24 and out of an outlet 24B of the rotodynamic pump 24. Broadly speaking, the method 100 may include a step 104 of varying an angular relationship between the inlet 24A and the outlet 24B to control the delivery pressure of the pump 24.

As seen in the description above, in some embodiments and applications of the pump 24, the step 104 of varying the angular relationship may include, in response to the delivery pressure falling below a delivery pressure setpoint, increasing an angle 32XD between the inlet 24A and the outlet 24B (shown as substep 104A). Similarly, the step 104 of varying the angular relationship may include, in response to the delivery pressure rising above the delivery pressure setpoint, decreasing the angle between the inlet 24A and the outlet 24B (shown as substep 104B).

Also as seen in the description above, in some embodiments and applications of the pump 24, the increasing the angle 32XD includes pivoting a first part of a housing 28, such as the movable housing portion 28A, of the rotodynamic pump 24 relative to a second part of the housing 28, such as the fixed housing portion 28B, in a first direction, with the first part defining one of the inlet 24A and the outlet 24B therein and the second part defining another one of the inlet 24A and the outlet 24B therein. Similarly, in some embodiments and applications of the pump 24, the decreasing the angle 32XD includes pivoting the first part relative to the second part in a second direction opposite to the first direction. In the embodiment shown in FIG. 2, the first direction is clockwise and the second direction is counterclockwise.

Further as seen in the description above, in some embodiments and applications of the pump 24, the pivoting the first part of the housing relative to the second part of the housing is about a rotation axis 30X of an impeller 30 of the rotodynamic pump 24. Also, in embodiments such as the FIG. 2 embodiment, the pivoting the first part relative to the second part of the housing 28 includes actuating, by fluid (in that embodiment, fuel) downstream of the impeller 30, a passive pressure regulating mechanism 32 as described above.

In embodiments in which an active pressure regulating mechanism is used, such as the active pressure regulating mechanism 34, to regulate the delivery pressure, the method 100 may include receiving a signal at a controller 36, the signal being indicative of the delivery pressure.

It is contemplated that the signal could be digital or analog, and could be transmitted to the controller 36 hydraulically, mechanically, or electrically/electronically via wire or wirelessly using a suitable corresponding transmission means, and depending on each particular embodiment of the pressure sensor(s) 36C and/or each particular embodiment of the controller 36. For example, it is contemplated that the signal could be a pneumatic or a hydraulic analog signal, transmitted to the controller 36 via air or a suitable hydraulic fluid.

In such embodiments active pressure regulating mechanism embodiments, the method 100 may further include operating, by the controller 36, an actuator 38 (or more than one corresponding actuators depending on the particular embodiment of the pump 24) of the active pressure regulating mechanism 34 to adjust the hydraulic distance/the angle 32XD between the inlet 24A and the inlet 24A in response to changes in the delivery pressure, to regulate the delivery pressure toward the delivery pressure setpoint.

In embodiments of the pump 24 having the housing 28 as described above, the operating the actuator(s) 38 includes correspondingly pivoting the first part (movable housing portion 28A) of the housing 28 relative to the second part (fixed housing portion 28B) of the housing 28. In some embodiments the pivoting is executed using a PID control algorithm with the delivery pressure being an input to the PID control algorithm. In other embodiments, other control algorithms are used.

Any suitable materials, construction and manufacturing methods could be used to construct the fuel system 17 and the pump 24, including the movable/adjustable fluid connections and corresponding parts of the pump 24, described above. It is contemplated that the delivery pressure setpoint may be selected to suit each particular application of the pump 24.

The above description is meant to be exemplary only, and one skilled in the art will recognize that changes may be made to the embodiments described without departing from the scope of the invention disclosed. As mentioned, the described fuel system may be used with any suitable aircraft engine system, and with any suitable liquid fuel pump type. Still other modifications which fall within the scope of the present invention will be apparent to those skilled in the art, in light of a review of this disclosure, and such modifications are intended to fall within the appended claims.

The invention claimed is:

1. A method of controlling a delivery pressure of an aircraft engine fuel system, comprising:
operating a rotodynamic fuel pump hydraulically connected to the fuel system to pump a fluid from an inlet of the rotodynamic pump and out of an outlet of the rotodynamic pump for delivery to the fuel system, and
varying an angular relationship between the inlet and the outlet of the pump to control the delivery pressure by displacing at least one of the inlet and the outlet to vary a distance between the inlet and the outlet.

2. The method of claim 1, wherein the varying the angular relationship includes, in response to the delivery pressure falling below a delivery pressure setpoint, increasing an angle between the inlet and the outlet.

3. The method of claim 2, wherein the varying the angular relationship includes in response to the delivery pressure rising above the delivery pressure setpoint, decreasing the angle between the inlet and the outlet.

4. The method of claim 1, wherein varying the angular relationship includes increasing and decreasing an angle between the inlet and the outlet, and wherein:
increasing the angle includes pivoting a first part of a housing of the rotodynamic pump relative to a second part of the housing in a first direction, the first part defining one of the inlet and the outlet therein, the second part defining another one of the inlet and the outlet therein, and
decreasing the angle includes pivoting the first part relative to the second part in a second direction opposite to the first direction.

5. The method of claim 4, wherein the pivoting the first part relative to the second part is about a rotation axis of an impeller of the rotodynamic pump.

6. The method of claim 5, wherein the first part and the second part define an impeller cavity therebetween and the impeller is disposed at least in part in the impeller cavity.

7. The method of claim 6, wherein the pivoting the first part relative to the second part includes actuating, by the fluid downstream of the impeller, a passive pressure regulating mechanism.

8. The method of claim 6, wherein the pivoting the first part relative to the second part includes receiving a signal at a controller, the signal being indicative of the delivery pressure, and operating, by the controller, an actuator of an active pressure regulating mechanism to pivot the first part relative to the second part in response to changes in the delivery pressure to regulate the delivery pressure toward a delivery pressure setpoint.

9. An aircraft engine fuel system comprising a rotodynamic pump having an inlet and an outlet connected to the fuel system, a pressure regulating assembly operatively associated with at least one of the inlet and the outlet, and a controller configured to vary an angle between the inlet and the outlet to regulate a delivery pressure at the outlet, the controller configured to displace at least one of the inlet and the outlet to vary a distance between the inlet and the outlet.

10. The fuel system of claim 9, wherein the pressure regulating assembly is configured to vary the angle in response to fluctuations in the delivery pressure.

11. The fuel system of claim 10, further comprising a fluid conduit hydraulically connecting the outlet to an actuator of the pressure regulating assembly, the actuator being operatively connected to the at least one of the inlet and the outlet of the pump to vary the angle.

12. The fuel system of claim 11, wherein the actuator is operatively connected to the at least one of the inlet and the outlet via a mechanical linkage.

13. The fuel system of claim 11, wherein the actuator is a linear actuator biased to a neutral position by a biasing member such that the linear actuator is in the neutral position when the delivery pressure is below a delivery pressure setpoint.

14. The fuel system of claim 9, comprising a housing having a first part and a second part movable relative to the first part, the first and second parts define an impeller cavity therebetween, an impeller being disposed at least in part in the impeller cavity, the first part defining one of the inlet and the outlet therein, the second part defining another one of the inlet and the outlet therein.

15. A rotodynamic pump, comprising
a housing defining an inlet and an outlet therein, the housing includes a first part and a second part, the first and second parts defining an impeller cavity therebetween, the first part is movable relative to the second part, the first part defines one of the inlet and the outlet, the second part defines another one of the inlet and the outlet,
an impeller disposed at least in part in the impeller cavity, and
a pressure regulating mechanism adapted to vary an angular relationship between the inlet and the outlet to control a delivery pressure at the outlet by moving the first part relative to the second part.

16. The rotodynamic pump of claim 15, wherein the pressure regulating mechanism is adapted to vary the angular relationship by pivoting the first part relative to the second part.

17. The rotodynamic pump of claim 16, wherein the first part is pivotable relative to the second part about a rotation axis of the impeller.

18. The rotodynamic pump of claim 17, wherein the pressure regulating mechanism is a passive pressure regulating mechanism operable by the fluid being at the delivery pressure.

19. The rotodynamic pump of claim 17, wherein the pressure regulating mechanism is an active pressure regulating mechanism comprising an actuator operatively connected to the first part to pivot the first part relative to the second part, and a controller operable to operate the actuator in response to a signal indicative of the delivery pressure.

* * * * *